United States Patent [19]
Lohmann et al.

[11] Patent Number: 5,730,062
[45] Date of Patent: Mar. 24, 1998

[54] DEVICE FOR CONNECTING RAIL VEHICLES

[75] Inventors: Alfred Lohmann, Siegen; Guido Bieker, Kirchhundem; Wolfram Schwab, Berlin; Eva Rother, Siegen; Christian Böhme, Berlin, all of Germany

[73] Assignee: ABB Henschel Aktiengesellschaft, Mannheim, Germany

[21] Appl. No.: 760,821

[22] Filed: Dec. 5, 1996

[30] Foreign Application Priority Data

Apr. 5, 1995 [DE] Germany ............ 195 12 630.0

[51] Int. Cl.⁶ .................................................. B61D 3/10
[52] U.S. Cl. ........................... 105/3; 105/4.1; 188/83
[58] Field of Search ................... 105/3, 4.1, 199.3, 105/199.4; 213/75 R; 188/83, 166, 167

[56] References Cited

U.S. PATENT DOCUMENTS

| | | | |
|---|---|---|---|
| 3,513,592 | 5/1970 | Ernst | 105/4.1 |
| 4,924,779 | 5/1990 | Curtis et al. | 105/4.1 |
| 5,207,161 | 5/1993 | Pileggi et al. | 105/4.1 |
| 5,271,678 | 12/1993 | Bourgeot | 105/4.1 |
| 5,456,185 | 10/1995 | Rother et al. | 105/4.1 |
| 5,605,208 | 2/1997 | Friedrichsen et al. | 188/83 |
| 5,615,786 | 4/1997 | Hoyon et al. | 105/4.1 |

FOREIGN PATENT DOCUMENTS

| | | | |
|---|---|---|---|
| 9726 | 1/1982 | European Pat. Off. | |
| 340760 | 12/1991 | European Pat. Off. | |
| 1504137 | 8/1989 | U.S.S.R. | 105/4.1 |
| 448518 | 6/1936 | United Kingdom | 105/4.1 |

*Primary Examiner*—S. Joseph Morano
*Attorney, Agent, or Firm*—Herbert L. Lerner; Laurence A. Greenberg

[57] ABSTRACT

A device for connecting rail vehicles formed of a plurality of interconnected first and second car parts having a rotary joint with a swiveling crown, includes a rotary-restraint device provided in the joint region between each two car parts. The rotary-restraint device includes two sliding bodies disposed at the periphery of the swiveling crown of the rotary joint. The sliding bodies interact with one another in a frictionally engaged manner and are each fastened to one of the two car parts connected in the rotary joint.

15 Claims, 3 Drawing Sheets

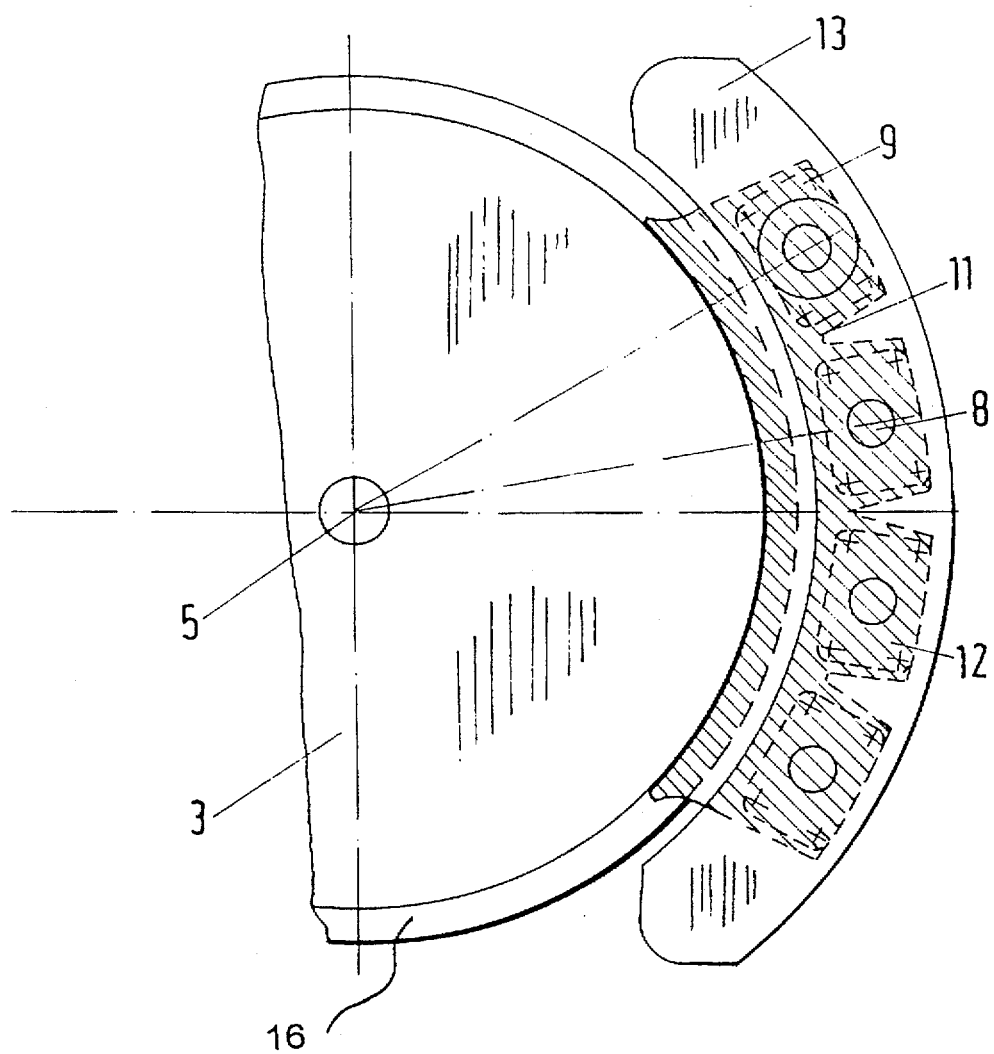

DEVICE FOR CONNECTING RAIL VEHICLES

CROSS-REFERENCE TO RELATED APPLICATION

This application is a Continuation of International Application PCT/EP96/01313, filed Mar. 26, 1996.

BACKGROUND OF THE INVENTION

1. Field of the Invention

The invention relates to a device for connecting rail vehicles formed of a plurality of interconnected car parts, including a rotary joint having a swiveling crown.

European Patent 0 340 760 B1 discloses such a device for a multiple-unit rail vehicle, in which the car parts that are connected to one another in each case have a common articulated connection. The known device is intended for rail vehicles having an especially low car floor so that there is only a little space available for such a rotary joint. The known device is therefore constructed as an enclosed swiveling crown which is provided with one inner ring each and one outer ring each and is connected in a flexurally and torsionally rigid manner to the one car part and through a joint having a horizontal axis of rotation to the other car part.

During operation, it is found quite generally in the case of rail vehicles and especially in the case of the known multiple-unit vehicle that oscillations are induced in the individual car parts when traveling on tracks, a factor which inevitably leads to unwanted movements of the vehicle. The movement about the vertical axis in particular, which is also called hunting, has a very adverse effect on the running behavior of the vehicle.

SUMMARY OF THE INVENTION

It is accordingly an object of the invention to provide a device for connecting rail vehicles, which overcomes the hereinafore-mentioned disadvantages of the heretofore-known devices of this general type and which prevents hunting of car parts connected to one another while at the same time ensuring that running properties of the vehicle when negotiating curves are not impaired.

With the foregoing and other objects in view there is provided, in accordance with the invention, in rail vehicles including a plurality of first and second car parts and a rotary joint interconnecting the car parts and having a swiveling crown, a device for connecting the rail vehicles, comprising a rotary-restraint device disposed in vicinity of the joint between each two of the car parts, the rotary-restraint device having two sliding bodies disposed at a periphery of the swiveling crown of the rotary joint, the sliding bodies interacting with one another in a frictionally engaged manner, and each of the sliding bodies being fastened to a respective one of the car parts.

During a possible deflection of a car part, namely during a rotary movement about the joint pivot, it is advantageous to ensure that an opposing moment, irrespective of the magnitude and velocity of the rotary movement, immediately counteracts a possible rotary or swiveling movement of a car part.

In accordance with another feature of the invention, the rotary-restraint device is disposed at the periphery of the swiveling crown at least in a certain region, with the sliding bodies adjoining the swiveling crown concentrically to the latter.

In accordance with a further feature of the invention, the sliding bodies are formed of a sliding plate on one hand and at least one friction lining on the other hand.

In accordance with an added feature of the invention, the sliding plate is firmly connected to one car part, while the friction lining is connected to the other car part.

In accordance with an additional feature of the invention, the friction lining is split up into a plurality of individual linings which are guided and held in so-called lining holders.

In accordance with yet another feature of the invention, in order to increase the contact force between the sliding plate on one hand and the friction lining on the other hand, compression springs are provided which load the friction linings against the sliding plate, as a result of which the desired rotary restraint can be increased.

In accordance with yet a further feature of the invention, the springs engage in so-called spring pockets which are disposed on the associated car part radially to the joint pivot and perpendicularly load a base, designated as a pressure plate, of the friction lining.

In accordance with yet an added feature of the invention, the pressure plate serves to transmit the contact force originating from the preloading applied by the compression springs as uniformly as possible to the contact area between the friction lining and the sliding plate on the other car part.

In accordance with yet an additional feature of the invention, there are provided shims to compensate for a decrease in the thickness of the friction linings due to wear and a decrease in the contact force associated therewith, the shims being inserted for the compensation between the springs and clamping elements, preferably screw bolts, serving to preload the springs.

In accordance with again another feature of the invention, there is provided a so-called segment plate being inserted between the pressure plate and the lining holder and serving to elastically adapt itself to a loss of thickness of the friction lining as a result of wear so that in this way an optimum contact pressure is also applied to the friction lining.

In accordance with again a further feature of the invention, the rotary-restraint device effects a frictionally engaged connection of the car parts which acts independently of the friction wear. The hunting motion of the individual car bodies can thereby be prevented and the entire vehicle movement can be stabilized.

In accordance with again an added feature of the invention, the friction moment produced by the rotary-restraint device according to the invention merely depends on the coefficient of friction of the material combination being used and on the acting contact force between the friction lining on one hand and the sliding plate on the other hand.

In accordance with a concomitant feature of the invention, it is only when negotiating curves that the rotary-restraint device is overcome by the magnitude of the relative movement of the car parts connected to one another in the rotary joint.

In order to prevent hunting movements and other adverse effects on the running behavior, European Patent 0 009 726 B1 has disclosed a device which is designated as a rotary restraint and serves to ensure straight-ahead travel without a disadvantage for negotiating curves, in other words with the possibility of turning out as required on the curved track.

However, the rotary-restraint device disclosed by European Patent 0 009 726 B1 is only intended for rail vehicles having a single or double running gear which has a suspension for leaf-bearing springs on which the device acts. A configuration in a joint of the type mentioned initially above is neither intended nor possible.

Other features which are considered as characteristic for the invention are set forth in the appended claims.

Although the invention is illustrated and described herein as embodied in a device for connecting rail vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a fragmentary, bottom-plan view of a part of a rotary joint.

DESCRIPTION OF THE PREFERRED EMBODIMENTS

Figure 1:
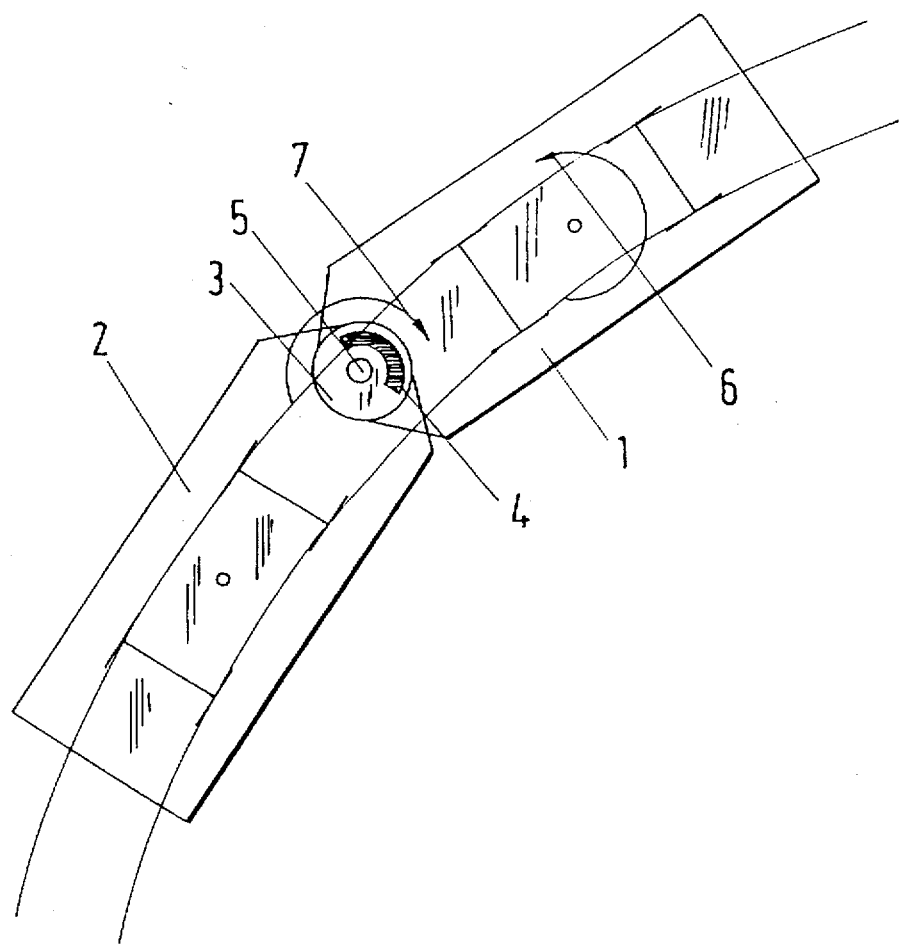
FIG. 1 is a diagrammatic, top-plan view showing two car parts connected to one another.

Referring now to the figures of the drawings in detail and first, particularly, to FIG. 1 thereof, there is seen a diagrammatic plan view of a configuration of two car parts 1, 2 which are pivotably connected to one another about a pivot 5 through the use of a rotary joint 3. A rotary-restraint device 4 according to the invention is shown as a wide, semicircular continuous shaded area at the rotary joint 3. This representation shows that the rotary-restraint device 4 according to the invention is disposed concentrically to a swiveling crown 16 of the rotary joint 3 having the pivot 5. The swiveling crown 16 is best seen in FIG. 3. The rotary-restraint device 4 according to the invention only covers a region of about 120° in the example shown.

Furthermore, a rotary movement 6 of the car part 1 about its vertical axis is indicated by a semicircular arrow. The rotary movement leads to instability in straight-ahead travel and is generally referred to as hunting. A further semicircular arrow designates an opposing moment 7 which is provided according to the invention for compensating for the hunting caused by the rotary movement 6. The opposing moment 7 acts in a stabilizing manner and counteracts the rotary movement 6 irrespective of its magnitude and velocity.

Figure 2:
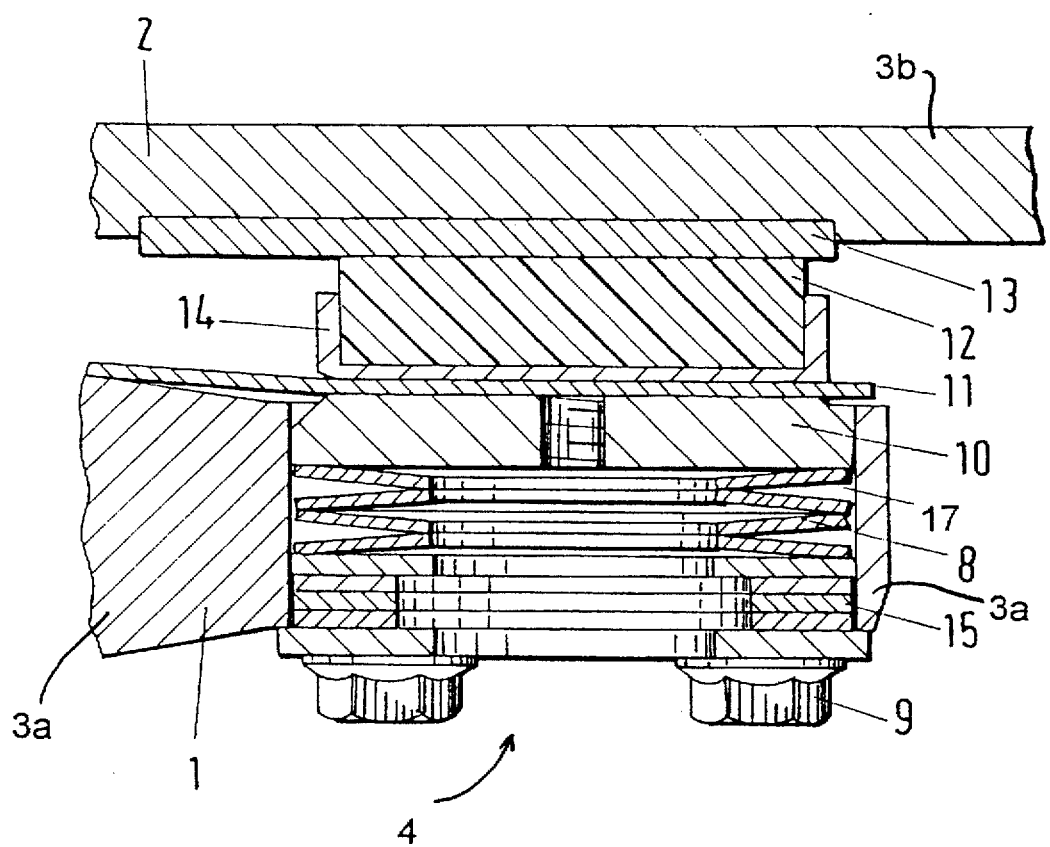
FIG. 2 is a fragmentary, longitudinal-sectional view of a rotary-restraint device.

A diagrammatic, longitudinal section through the rotary-restraint device 4, the first car part 1 and the second car part 2 is shown in FIG. 2. The first car part 1 is coupled to the second car part 2 in an articulated manner through the rotary joint 3. FIG. 2 in particular shows details of the rotary-restraint device 4 disposed radially at a distance from the pivot 5 (which is only suggested in FIG. 2) of the rotary joint 3. The details of the rotary-restraint device 4 include joint parts 3a, 3b, spring pockets 17, a compression spring 8 which is constructed in this case as a disc-spring stack, as well as clamping screws 9 and a pressure plate 10. Furthermore, the rotary-restraint device 4 according to the invention includes a segment plate 11 supporting a lining holder 14 having a friction lining 12 inserted therein, and a sliding plate 13 which is connected to the second car part 2 and serves as stop surface for the friction lining 12. The elements 12 and 13 may be referred to as sliding bodies. Shims 15, which are inserted between elements of the compression spring 8 and the clamping screws 9 depending on requirements, serve to set a desired preloading force of the compression spring 8.

Finally, a partially-sectional, bottom-plan view of the rotary joint 3 and the rotary-restraint device 4 according to the invention is shown in FIG. 3. It can be recognized from FIG. 3 that a plurality of compression springs 8 are provided, which in each case engage in a friction-lining element 12. The friction-lining elements 12 in turn bear against the sliding plate 13. Furthermore, the contour of the segment plate 11 with its recesses can be seen.

With regard to the interaction of the details apparent from the figures and the mode of operation of the rotary-restraint device 4 according to the invention, the following may be emphasized. The spring pockets 17 for the perpendicular fitting of the springs 8 are provided at the car part 1 radially to the joint pivot 5 of the joint part 3a. Each of these springs 8 is fastened with the screws 9 to the joint part 3a of the car part 1 in these spring pockets 17. The springs act perpendicularly to the pressure plates 10.

The slotted segment plate 11, which is oriented radially to the joint pivot 5 and is likewise fastened to the joint part 3a of the car part 1, bears against the pressure plates 10.

The friction linings 12 fastened in the lining holder 14 are located on the segment plate 11. The friction linings 12 lie under the sliding plate 13, which is firmly fastened to the joint part 3b of the car part 2. The joint part 3b is likewise firmly disposed at the car part 2, and the joint parts 3a and 3b of the joint 3 are fixed at a vertical distance from one another. Since the pressure plates 10 and the segment plate 11 are not connected to one another, a constant, flat pressing of the friction linings 12 against the sliding plate 13 is ensured.

The slotted segment plate 11 can adapt itself elastically to friction-lining wear. Upon the slightest rotary movement between the linings and the sliding plate, the maximum value of a realizable friction moment is achieved immediately by ensuring freedom from play between the friction linings 12 and the sliding plate 13. During a rotary movement of the car parts 1, 2, the sliding plate 13 which is fastened to the joint part 3b of the car part 2 sweeps over the friction linings 12, which are pressed against the sliding plate 13 by spring forces through the pressure plates 10 and the segment plate 11.

The resulting friction moment can be set upon assembly by variable spring preloading. To that end, the shims 15 are placed underneath the springs 8. Furthermore, the shims are inserted to compensate for the spring force which is altered by the wear of the friction linings.

We claim:

1. In rail vehicles including a plurality of first and second car parts and a rotary joint interconnecting the car parts and having a swiveling crown, a device for connecting the rail vehicles, comprising:

a rotary-restraint device being integrated in the joint between each two of the car parts, said rotary-restraint device having two sliding bodies being horizontally opposed to each other and disposed at a periphery of the swiveling crown of the rotary joint, said sliding bodies interacting with one another in a frictionally engaged manner, and each of said sliding bodies being fastened to a respective one of the car parts; and said sliding bodies being a sliding plate and at least one friction lining.

2. The device according to claim 1, wherein said rotary-restraint device is disposed at a periphery of the swiveling crown at least in a given region, and said sliding bodies adjoin the swiveling crown concentrically to the swiveling crown.

3. The device according to claim 1, wherein said sliding plate is fixedly connected to one of the car parts and said at least one friction lining is connected to the other of the car parts.

4. The device according to claim 1, including lining holders, said at least one friction lining including a plurality of individual linings guided and held in said lining holders.

5. The device according to claim 1, including at least one compression spring for increasing contact force between said sliding plate and said at least one friction lining.

6. The device according to claim 5, wherein said at least one compression spring loads said at least one friction lining against said sliding plate for increasing a desired rotary restraint.

7. The device according to claim 1, wherein said rotary-restraint device forms a frictionally engaged connection of the car parts independent of friction wear, prevents hunting of individual car bodies and reads to stabilization of entire vehicle movement.

8. The device according to claim 1, wherein said rotary-restraint device produces a friction moment in dependence on a coefficient of friction of a material combination used and on an acting contact force between said at least one friction lining and said sliding plate.

9. The device according to claim 1, wherein the car parts connected to one another in the rotary joint have a magnitude of relative movement exceeding a rotary restraint of said rotary-restraint device only when negotiating curves.

10. In rail vehicles including a plurality of first and second car parts and a rotary joint interconnecting the car parts and having a swiveling crown and a joint pivot, a device for connecting the rail vehicles, comprising:

a rotary-restraint device disposed in vicinity of the joint between each two of the car parts, said rotary-restraint device having two sliding bodies disposed at a periphery of the swiveling crown of the rotary joint, said sliding bodies interacting with one another in a frictionally engaged manner, and each of said sliding bodies being fastened to a respective one of the car parts;

said sliding bodies being a sliding plate and at least one friction lining;

at least one compression spring for increasing contact force between said sliding plate and said at least one friction lining;

spring pockets disposed on one of the car parts radially of the joint pivot; and a pressure plate acting as a base for said at least one friction lining, and said at least one compression spring engaging in said spring pockets and perpendicularly loading said pressure plate.

11. The device according to claim 10, wherein said pressure plate transmits the contact force originating from a preloading applied by said at least one compression spring as uniformly as possible to a contact area between said at least one friction lining and said sliding plate on the other of the car parts.

12. The device according to claim 10, including shims for compensating for a decrease in thickness of said at least one friction lining due to wear and an attendant decrease in the contact force, and clamping elements for preloading said at least one compression spring, said shims being inserted between said at least one compression spring and said clamping elements for providing the compensation.

13. The device according to claim 12, wherein said clamping elements are screw bolts.

14. The device according to claim 10, including a lining holder guiding and holding said at least one friction lining, and a segment plate inserted between said pressure plate and said lining holder.

15. The device according to claim 14, wherein said segment plate elastically adapts itself to a loss of thickness of said at least one friction lining as a result of wear, for optimally applying contact pressure to said at least one friction lining.

* * * * *